(12) United States Patent
Stanev

(10) Patent No.: US 8,918,429 B2
(45) Date of Patent: Dec. 23, 2014

(54) DATABASE VERSIONING SYSTEM

(75) Inventor: Traian Iavorov Stanev, Montreal (CA)

(73) Assignee: Autodesk, Inc., San Rafael, CA (US)

(*) Notice: Subject to any disclaimer, the term of this patent is extended or adjusted under 35 U.S.C. 154(b) by 74 days.

(21) Appl. No.: 13/354,885

(22) Filed: Jan. 20, 2012

(65) Prior Publication Data
US 2013/0138695 A1    May 30, 2013

Related U.S. Application Data

(60) Provisional application No. 61/565,472, filed on Nov. 30, 2011.

(51) Int. Cl.
*G06F 17/30* (2006.01)

(52) U.S. Cl.
CPC .............. *G06F 17/30309* (2013.01)
USPC ........................................ 707/792; 707/695

(58) Field of Classification Search
CPC ....... G06F 8/71; G06F 17/2288; G06F 17/24; G06F 1/30309; G06F 17/30356; G06F 17/30569
USPC ........................................................ 707/792
See application file for complete search history.

(56) References Cited

U.S. PATENT DOCUMENTS

| | | | |
|---|---|---|---|
| 5,903,897 A * | 5/1999 | Carrier et al. | 707/999.203 |
| 6,631,386 B1 * | 10/2003 | Arun et al. | 707/999.203 |
| 7,099,899 B2 * | 8/2006 | Choy et al. | 707/999.201 |
| 7,251,669 B1 * | 7/2007 | Arora | 707/695 |
| 7,437,722 B2 * | 10/2008 | Poole | 717/170 |
| 7,805,439 B2 * | 9/2010 | Elliott et al. | 707/726 |
| 7,836,028 B1 * | 11/2010 | Agarwal et al. | 707/695 |
| 8,005,792 B2 * | 8/2011 | Green et al. | 707/638 |
| 2005/0198630 A1 * | 9/2005 | Tamma et al. | 717/175 |
| 2007/0239774 A1 * | 10/2007 | Bodily et al. | 707/103 R |
| 2010/0042605 A1 * | 2/2010 | Cheng et al. | 707/4 |

OTHER PUBLICATIONS

SQLite webpages, [online]. [Retrieved on Aug. 27, 2013]. Retrieved from the Internet: <URL: http://www.sqlite.org/docs.html>, 4 pages.
Git webpages, [online]. [Retrieved on Aug. 28, 2013]. Retrieved from the Internet: <URL: http://git-scm.com/about>, 2 pages.
Salzberg and Tsotras, Comparison of Access Methods for Time-Evolving Data, ACM Computing Surveys, vol. 31, No. 2, Jun. 1999, pp. 158-221.

(Continued)

*Primary Examiner* — Rehana Perveen
*Assistant Examiner* — Tiffany Thuy Bui
(74) *Attorney, Agent, or Firm* — Fish & Richardson P.C.

(57) ABSTRACT

Methods, systems, and apparatus, including computer programs encoded on a computer storage medium, for identifying one or more rows in a relational database that have each been modified since a first point in time, wherein each of the rows is associated with a respective table in the relational database; for each of the identified rows, updating a respective file in an external representation of the table associated with the row to reflect the modification to the row wherein the respective file is not stored in the database; and creating a first version of the relational database in a version control system using the external representation including one or more of the updated files, wherein the first version of the database comprises one or more files in the version control system.

21 Claims, 3 Drawing Sheets

(56) References Cited

OTHER PUBLICATIONS

Wikipedia, The free encyclopedia, Diff, [online]. [Retrieved on Aug. 27, 2013]. Retrieved from the Internet: <URL: http://en.wikipedia.org/wiki/Diff>, 11 pages.

Wikipedia, The free encyclopedia, Diff3, [online]. [Retrieved on Aug. 27, 2013]. Retrieved from the Internet: <URL: http:// http://en.wikipedia.org/wiki/Diff3>, 2 pages.

* cited by examiner

DATABASE VERSIONING SYSTEM

CROSS-REFERENCE TO RELATED APPLICATIONS

Under 35 U.S.C. §119, this application claims benefit of U.S. Provisional Application Ser. No. 61/565,472, filed Nov. 30, 2011, the entire contents of which are hereby incorporated by reference.

BACKGROUND

This specification relates to digital information retrieval, and particularly to providing versioning for databases.

SUMMARY

In general, one aspect of the subject matter described in this specification can be embodied in methods that include the actions of identifying one or more rows in a relational database that have each been modified since a first point in time, wherein each of the rows is associated with a respective table in the relational database; for each of the identified rows, updating a respective file in an external representation of the table associated with the row to reflect the modification to the row wherein the respective file is not stored in the database; and creating a first version of the relational database in a version control system using the external representation including one or more of the updated files, wherein the first version of the database comprises one or more files in the version control system. Other embodiments of this aspect include corresponding systems, apparatus, and computer programs.

These and other aspects can optionally include one or more of the following features. A particular row of the identified rows is modified if the particular row has been created, deleted, or changed in the database since the first point in time. Each respective file stores a plurality of rows of a table in the database. Identifying the plurality of rows is performed by a database management system. Creating the new version is performed by a version control system. One or more differences are determined between one or more files of the first version of the relational database in the version control system and one or more files of a different second version of the relational database in the version control system; and one or more database commands are executed based on the determined differences so that contents of the relational database are the same as the second version. A change to the relational database is detected and a second version of the database is created in the version control system based on the detected change. One or more database commands are executed based on one or more determined differences between the first version of the relational database and the second version of the relational database to restore the relational database to the first version of the database. One or more database commands are executed based on one or more determined differences between the first version of the relational database and the second version of the relational database to restore the relational database to the second version of the database.

Particular embodiments of the subject matter described in this specification can be implemented to realize one or more of the following advantages. The version control system and database management system do not need to be modified in order to be used for database versioning. Database versions can be stored locally or in a central repository. Likewise, the database itself can be stored locally or centrally. A database can be dynamically switched between versions using operations that minimize the amount of changes to the database in order to change it to a different version. Various implementations support undo and redo operations which rely on temporary versions of the database created in the version control system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A Database Management System (DBMS) is software that controls the creation, maintenance, and the use of one or more underlying databases. Examples of databases include row or column-oriented relational databases and object-oriented databases. Other types of databases are possible. A relational database organizes information in tables, rows and columns. An example is a list of customers, which would be represented as a table, which contains one row for each individual customer, and each row has columns for name, address, phone number, and so on. Another example is the set of tax parcels in a city—in such a case each row may also contain a geometric description of the parcel, in addition to columns for valuation, owner, address, and so on. The DBMS provides functionality for inserting, deleting, updating and selecting rows from tables in a database. This can be done, for example, using an application programming interface provided by the DBMS or a query language like Structured Query Language (SQL). Other types of query languages are possible, however.

A Version Control System (VCS) is software that tracks and maintains control over changes to a set of one or more electronic files. A set of files in the VCS is referred to as a version or "branch". The VCS allows users or software processes to create, modify, or delete files in a given version, or create new version based on changes to files in an existing version. Different versions of a set of files can exist simultaneously. Each version is associated with a time stamp which indicates when the version was created or last modified in the VCS. Versions can be compared, restored, and in some cases, merged. In various implementations, a database can be exported from the DBMS to an external representation comprising a set of one or more electronic files, and the external representation can then be created as a new version in the VCS. In further implementations, each VCS version is a version of an entire database. Switching the a database's contents from one version to another in the DBMS is performed efficiently, however, as is described further below.

Figure 1:
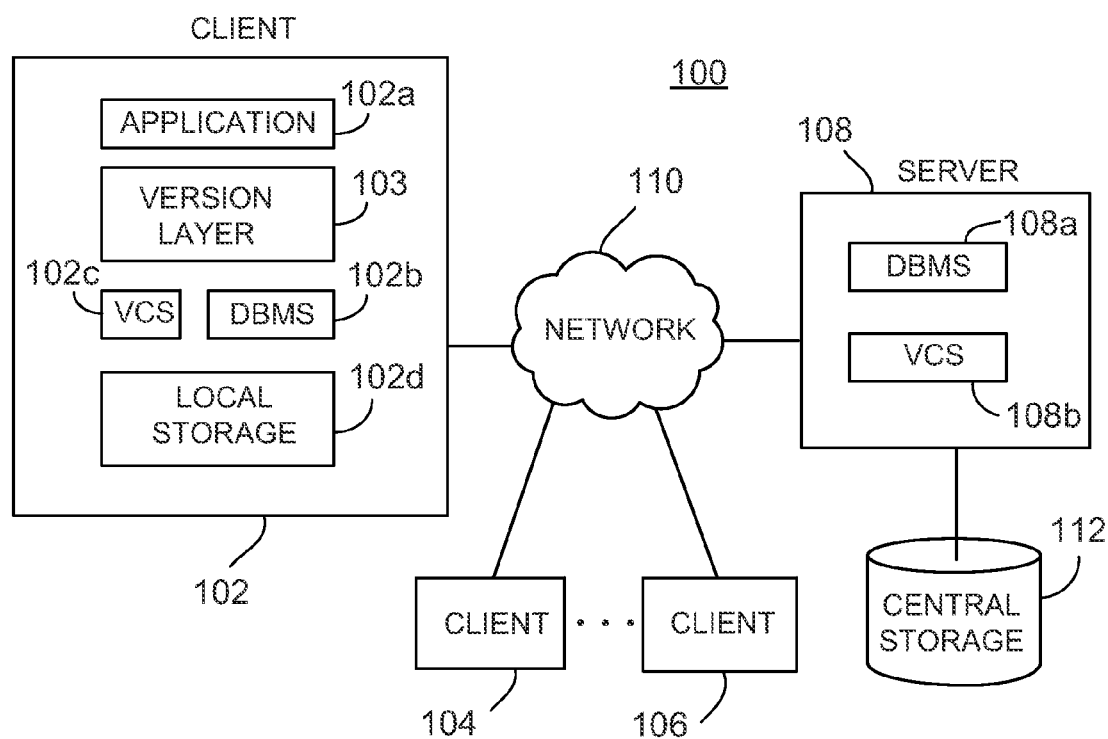
FIG. 1 is an illustration of an example database versioning system for maintaining multiple versions of the data stored in a database management system using a version control system.

FIG. 1 is an illustration of an example database versioning system 100 for maintaining multiple versions of the data stored in a database management system (DBMS) using a version control system (VCS). By way of illustration, the DBMS can be a relational DBMS and the VCS can be a distributed VCS. Other types of database management systems and version control systems are possible. The system includes one or more clients (e.g., clients 102, 104 and 106) which can optionally communicate with one or more servers (e.g., server 108) through a network 110 such as an intranet or the Internet, for example. Clients and servers are data processing apparatus such as, for example, personal computers and server computers, respectively.

In some implementations, a client includes software applications or modules that implement a version layer (version layer 103), a DBMS (e.g., DBMS 102b) and a VCS (e.g., VCS 102c) which execute on the client (e.g., client 102). Clients can include local storage 102d such as a hard disk, Flash memory, or other persistent storage, for storing information used by the DBMS 102b and the VCS 102c. In other implementations, clients can utilize non-local storage accessible through the network 110 by means of a distributed network file system or other type of network-accessible storage system. Clients optionally include a software application 102a that is configured to utilize the DBMS 102a. In some implementations, the software application 102a is a Computer Aided Design (CAD) program. Alternatively, the clients do not include software applications or modules that implement the DBMS and the VCS. Instead, the server 108 includes these software applications or modules (DBMS 108a and VCS 108b) and the clients issue requests to the DBMS 108a and VCS 108b on behalf of the application 102a.

The version layer 103 uses the VCS to store, retrieve and modify versions of databases in the DBMS. In some implementations, the VCS 102c stores database versions in local client storage 102d. This allows differences between versions to be quickly computed on the client 102 because the information needed to perform the difference is available locally. In other implementations, the VCS 102c or 108b stores database versions centrally in a central storage system 112 which is accessible through the server 108. The central storage system 112 can implement a distributed network file system on top of persistent storage, for example. Using built-in remote distribution functionality of the VCS, which replicates database versions to the central storage system 112, users can choose to synchronize the contents of their VCS data stored in local storage 102d with the contents of the central storage 112. This operation can be performed, for example, by issuing remote synchronization commands to the VCS.

Figure 2:
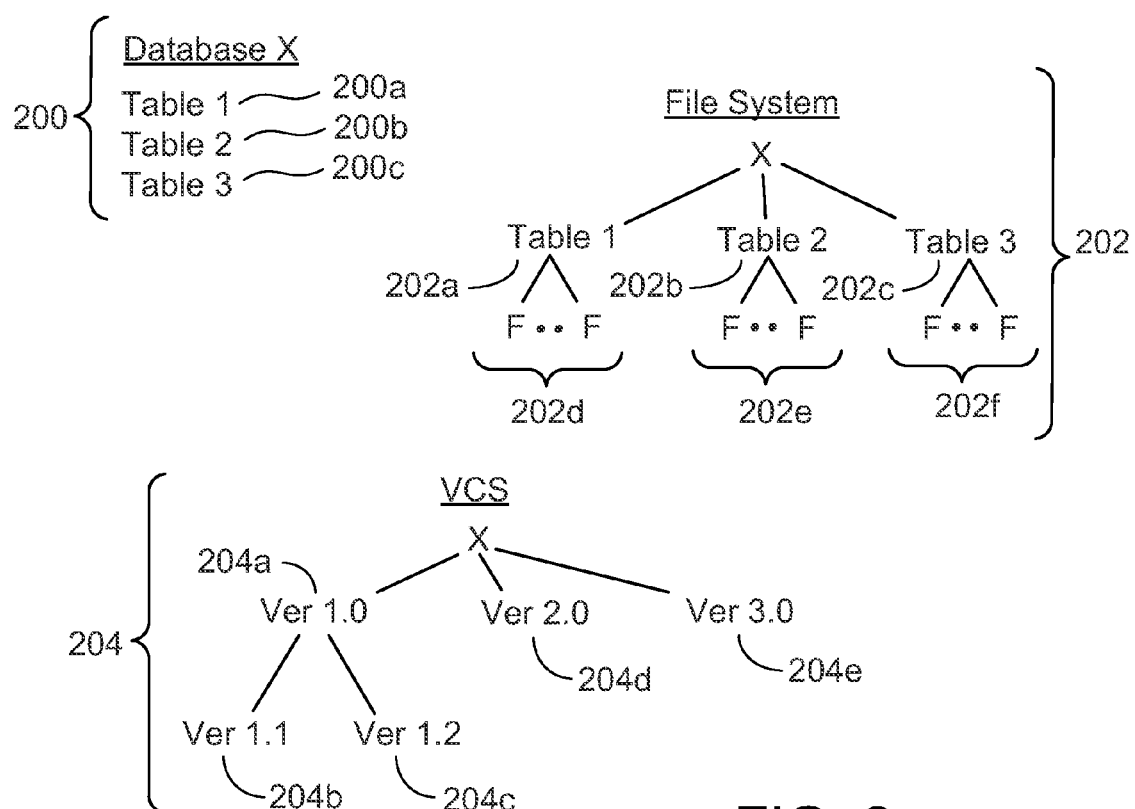
FIG. 2 is an example external representation of a database in a file system and in a version control system.

FIG. 2 is an example external representation of a database 200 in a file system 202 and in a VCS 204. The external representation of a database allows for efficient updating of the contents of a live database in the DBMS to represent any given version. The efficiency stems from mapping database versions to the versions in the VCS, serializing row data to files in a specific format, and exploiting the intrinsic efficiency of various VCS operations to "morph" the contents of the database from one version of the data to another.

In order to enable versioning for a database, the contents of the database are inserted into the VCS. In various implementations, this is accomplished by the version layer 103 first creating an external representation of the database in a file system (e.g., local storage 102d or central storage 112) that is outside of the control of the DBMS by commanding the DBMS to export data of the database. In some implementations, each table in the database is represented by a directory in the file system representation 202. For example, a database 200 named "X" comprises three tables: the Table$_1$ (200a), Table$_2$ (200b), and Table$_3$ (200c). In some implementations the name of the directory matches the name of the table. The external file system 202 representation of the database 200 includes a directory for Table$_1$ (directory 202a), Table$_2$ (directory 202b) and Table$_3$ (directory 202c). Each table directory includes one or more files which store the serialized rows of the respective table. For example, the Table$_1$ directory (202a) contains files 202d, the Table$_2$ directory (202b) contains files 202e, and the Table$_3$ directory (202c) contains files 202f.

In various implementations, each file contains a table's rows with a fixed range of database row identifiers, and the file's name reflects that range. For example a file named "0" contains rows 0 to 255, a file named "1" contains rows 256 to 511, and so on. The number of rows per file can be such that the resulting file size is approximately optimal for the VCS. Inside each file, table rows can be serialized as text with column values listed in a way that is simple to convert back to a binary representation used by the DBMS. In some implementations, the column names do not need to be explicitly stored for each row, since they do not vary and knowing their order is sufficient to know the column corresponding to each value in the comma separated list.

In some implementations, the version layer 103 serializes the rows to JavaScript Object Notation (JSON) format, one row per line in the file. (Other formats are possible.) The following shows four example table rows as they would be represented in such a file using JSON format (note that new lines are marked with [NL], in order to distinguish them from line wrapping):

[
  [1,{"type": "Polygon","coordinates": [[[−123.7243,46.9727],
  [−123.7242,46.9727],[−123.7242,46.9726],[−123.7243,46.9726],
  [−123.7243,46.9727]]]},null,null,5,"1","brick_facades:Paulus",
  null,null,null,4.000000,null,33.000000,
  "Bikepaths:Mat_MV_BikeBricks01"][NL]
  , [NL]
  [2,{"type": "Polygon","coordinates": [[[−123.7243,46.9724],
  [−123.7242,46.9724],[−123.7242,46.9723],
  [−123.7243,46.9723],[−123.7243,46.9724]]]},null,
  null,5,"2","brick_facades:Dina",null,null,null,4.000000,null,22.000000,
  "Bikepaths:Mat_MV_BikeBricks01"][NL]
  , [NL]
  [3,{"type": "Polygon","coordinates": [[[−123.7237,46.9728],
  [−123.7235,46.9728],[−123.7235,46.9727],[−123.7237,46.9727],
  [−123.7237,46.9728]]]},null,null,5,"3","brick_facades:Dina",
  null,null,null,12.000000,null,22.000000,
  "Bikepaths:Mat_MV_BikeBricks01"][NL]
  , [NL]
  [4,{"type": "Polygon","coordinates": [[[−123.7244,46.9732],
  [−123.7242,46.9732],[−123.7242,46.9730],[−123.7244,46.9730],
  [−123.7244,46.9732]]]},null,null,5,"4","brick_facades:Dina",
  null,null,null,12.000000,null,0.000000,"Roadways:p_fill02a"][NL]
  ...
]

After serializing the table rows, a file-based ("external") representation 202 of the contents of the database 200 exists. At this point the version layer 103 can command the VCS (e.g., using a "commit" operation) to initialize a new version in the VCS using the set of files in the file-based representation 202. By way of illustration, VCS contains the following versions of database 200: version 1.0 (204a), version 2 (204d) and version 3 (204e). Version 1.0 (204a) contains sub-version 1.1 (204b) and sub-version 1.2 (204c). In some implementations, the VCS maintains each database version as a set of binary files 204 on a file system (e.g., local storage 102d or central storage 112) which the VCS manages independently of the application 102a logic. For example, subversion 1.2 (204c) can contain the contents of the external representation 202.

Once a new version of a database is active in the DBMS, the user or the software application (e.g., application 102a) is free to query and make changes to rows in the database using SQL commands or by using the software application in ways that result in updates to the database. To keep track of exactly which rows change in a database, SQL triggers can be used so insert a row into so called "journal" tables whenever a row is inserted, updated or deleted in a database tables. Triggers are commands executed automatically whenever certain operations or events happen in a given table or in the database in general. Journal tables contain the identifiers of rows that become "dirty" due to modification. For simplicity, a separate journal table can be maintained for each database table that is versioned. The journal tables are not versioned; they are automatically filled up with information about which rows change.

At a point in time when the application or the user decides to synchronize the data in the DBMS with a VCS version, the rows identified in each journal table are serialized by the version layer 103 to their respective external row text files corresponding to the tables to which the rows belong. This ensures that only rows that have been modified are serialized. After this partial serialization, the external representation matches the database contents, and a "commit" VCS operation is executed by the version layer 103 to add the changed text files into the version control content store. The journal tables can then be emptied since the version in the VCS now exactly matches the current state of the database. In some implementations, the VCS "commit" operations record checkpoints at which the DBMS and the VCS contents match, and can then be used for switching between versions.

A database in the DBMS can be switched from one version to another by the version layer 103. Similar to the "journaling" scheme used for reflecting changes from the DBMS to the VCS, the version layer 103 identifies exactly what rows changed in the VCS representation of the database version from the last "commit" operation. To get the list of changes, the version layer 103 executes a "diff" operation, which is a common way to list changes made to text files on a per-line basis. The diff operation can be natively implemented by the VCS.

The output of the diff operation lists all text lines in row text files which changed from one commit (A) to another (B), between two versions, or between the last commit and the current state of the serialized row files. To switch the DBMS from containing version/commit A to version/commit B, the version layer 103 executes a text diff from A to B, using the VCS. The result of a diff might look as follows:

```
diff --git a/external/BUILDINGS/3 b/external/BUILDINGS/3
index 15014f1..0701875 100644
---a/external/BUILDINGS/3
+++ b/external/BUILDINGS/3
@@ -358 +358 @@
-[946,{"type": "Polygon","coordinates":
[[[13.0479,47.8184],[13.0478,47.8184],[13.0479,47.8185],[13.0480,
47.8186],[13.0480,47.8185],[13.0479,47.8184]]]},
null,null,3,"502615",null,null,null,null,null,null,null,0.500000,null,
null,"marble_stone_facades:Elisabeth:Arrangement1",
"brick_facades:Beetle",8.899492,null,null,null]
+[946,{"type": "Polygon","coordinates":
[[[13.0479,47.8184],[13.0478,47.8184],[13.0479,47.8185],[13.0480,
47.8186],[13.0480,47.8185],[13.0479,47.8184]]]},
null,null,3,"502615",null,null,null,null,null,null,null,0.500000,null,
null,"marble_stone_facades:Elisabeth:Arrangement1",
"brick_facades:Beetle",10.000000,null,null,null]
    diff --git a/external/ROADS/3 b/external/ROADS/3
    index 001c1db..9467f36 100644
    ---a/external/ROADS/3
```

-continued

```
+++ b/external/ROADS/3
@@ -366,0 +367,2 @@
+,
+[951,{"type": "LineString","coordinates":
[[[13.0479,47.8180,19.6607],[13.0481,47.8182,19.7025],[13.0483,
47.8183,19.7445]]]},null,null,-1,"e5b24ab6-75a0-11e0-
8000-d4856406fc3c",null,null,null,null,null,null,null,0.100000,null,null,
null,"DefaultStreetStyles:STREET_STYLE "]
```

This diff shows an update made to row number 946 of the BUILDINGS table, and an insertion done to the ROADS table. The "external" files affected are "BUILDINGS/3" and "ROADS/3". Note that the diff output includes a '+' or '−' character next to rows which are added and removed respectively. If a row was changed, its "from" version appears with a '−' and the "to" version appears with a '+'.

Due to the intentional organization of row-per-line in the row text files, each line (or each two lines in case of updates) in the diff text corresponds to an entire row of a database table. The version layer 103 infers target table names from the diff text (lines prefixed by '+++' and '---') and interprets lines representing rows (prefixed by single '+' and '−') as SQL insert, update or delete commands and applies those to the DBMS. Once each line in the diff text stream is applied as command to the database in the DBMS, the database contains exactly the rows of version B. Moreover, the number of commands the version layer 103 has to execute is minimal. Subsequently we also execute a VCS command to switch the external representation files to version B as well, to be consistent with the database state—this is an operation that can be performed automatically by the VCS.

A complication may arise when merging two versions (for example when adding work from a work-in-progress version into the master version) in the case when both versions contain independent modifications to the same row. In this case the version layer 103 can use the diff3 (which compares 3 files and determines differences between them) output to first insert textual "conflict markers" into the external text representation (usually sequences of '>' and '<' characters). The markers show all rows for which there is a merge conflict, in which case the application logic decides which version to use for the merged row.

Figure 3:
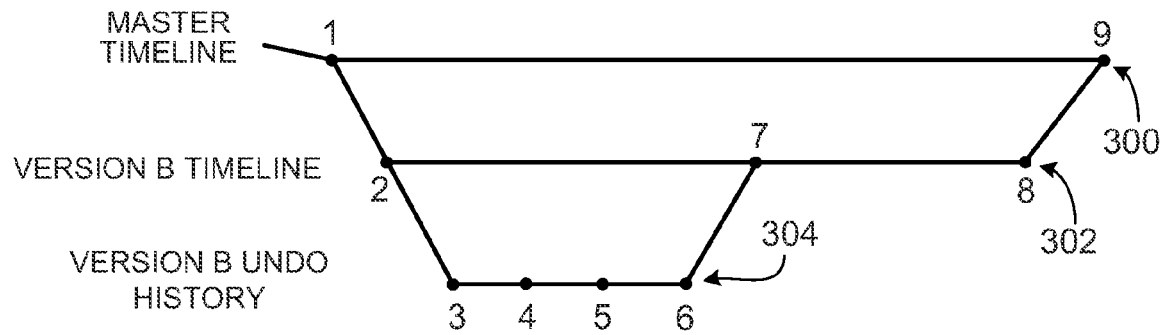
FIG. 3 is an diagram of example version control system branches reflecting changes to a database.

FIG. 3 is a diagram of example version control system branches reflecting changes to a database. The VCS contains timelines 300-304 each representing a specific version of the database. The Master version of the database is represented by timeline 300 and was created in the VCS at time 1. A second version of Master database, Version B, was created at time 2 and is represented by timeline 302. Version B of the database might hold proposed changes to the master version without yet modifying the master version, for example. A key insight is that the VCS contains all history and versions of a database while the DBMS contains a version of the database at one point in time (so the DBMS contents can represent the database at any one of the numbered points in FIG. 3). As described above, the version layer 103 can switch the contents of a database in the DBMS from representing one of the numbered points to another (e.g., between the Master version at time 1 and Version B at time 2, or vice versa) by using the VCS "diff" functionality. In some implementations, an undo and redo functionality can be implemented by the version layer 103 using its ability to switch between versions of a database.

By way of illustration, suppose a user wants to do an edit while they are working on Version B of a database in the DBMS. At this point the version layer 103 will silently create another, temporary version in the VCS (Version B Undo History as indicated by timeline 304), which will contain the undo history of the edits. At the moment of creation at time 3, the Version B Undo History contains the same exact data as Version B branch at time 2. When the user edits the database in the DBMS, the change is first done directly to the database by the DBMS application logic. At this time, the DBMS contents are "ahead" of the contents of the VCS. This is when the version layer 103 reads the journal table(s) to see what row identifiers the user modified, and then writes the row's corresponding text files into the VCS. The edits are then committed to the VCS at time 4 in Version B Undo History. An "undo" command by the user at that point will jump the contents of the database back to time 3. A "redo" command at time 3 will jump the contents of the database to time 4 again. At some point, the user will exit their application (e.g., application 102a) or perform a watershed operation that has to flush the undo history) at which point the version layer 103 merges the Version B Undo History back into its parent branch Version B at time 7. Note that the contents of the DBMS do not change between times 6 and 7.

Figure 4:
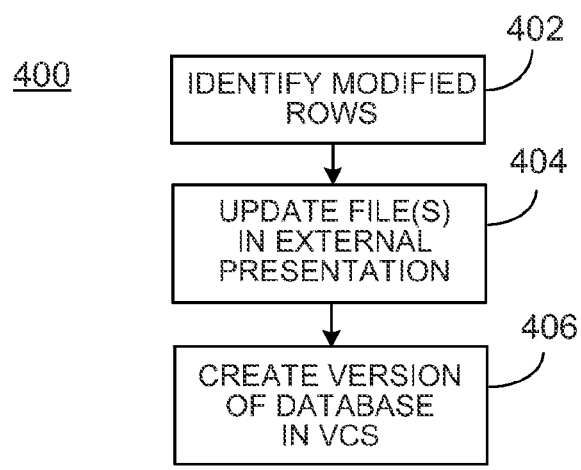
FIG. 4 is a flowchart of example technique for creating a version of a database in an external version control system.

FIG. 4 is a flowchart of example technique for creating a version of a database in an external version control system that can be implemented by software executing on one or more data processing apparatus. One or more of rows in a relational database that have each been modified since a first point in time are identified, wherein each of the rows is associated with a respective table in the relational database (step 402). For each of the identified rows, a respective file is updated in an external representation of the respective table associated with the row to reflect the modification to the row wherein the respective file is not stored in the database (step 404). The a version of the database is created in a version control system using the updated files, wherein the first version of the database comprises one or more files in the version control system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    identifying one or more rows in a relational database that have each been modified since a first point in time, wherein each of the rows is associated with a respective table in the relational database;
    serializing each of the identified rows into a respective serialized format wherein the serialized format does not include structured query language;
    for each of the identified rows, updating a respective file in an external representation of the table associated with the row with the respective serialized format of the row wherein the respective file is not stored in the database;
    creating a first version of the relational database in a version control system using the external representation including one or more of the updated files, wherein the first version of the database comprises one or more files in the version control system;
    determining one or more differences between one or more files of the first version of the relational database in the version control system and one or more files of a different version of the relational database in the version control system, and executing one or more database commands based on the determined differences so that contents of the relational database are the same as the different version; and
    detecting a change to the relational database, and creating a second version of the database in the version control system based on the detected change.

2. The method of claim 1, wherein a particular row of the identified rows is modified if the particular row has been created, deleted, or changed in the database since the first point in time.

3. The method of claim 1, wherein each respective file stores a plurality of rows of a table in the database.

4. The method of claim 1, wherein identifying the one or more rows is performed by a database management system.

5. The method of claim 1, wherein creating the first version and creating the second version is performed by a version control system.

6. The method of claim 1, further comprising:
executing one or more database commands based on one or more determined differences between the first version of the relational database and the second version of the relational database to restore the relational database to the first version of the database.

7. The method of claim 1, further comprising:
executing one or more database commands based on one or more determined differences between the first version of the relational database and the second version of the relational database to restore the relational database to the second version of the database.

8. A program product stored on a non-transitory computer readable medium including instructions that are operable, when executed by a data processing apparatus, to cause the data processing apparatus to perform operations comprising:
identifying one or more rows in a relational database that have each been modified since a first point in time, wherein each of the rows is associated with a respective table in the relational database;
serializing each of the identified rows into a respective serialized format wherein the serialized format does not include structured query language;
for each of the identified rows, updating a respective file in an external representation of the table associated with the row with the respective serialized format of the row wherein the respective file is not stored in the database;
creating a first version of the relational database in a version control system using the external representation including one or more of the updated files, wherein the first version of the database comprises one or more files in the version control system;
determining one or more differences between one or more files of the first version of the relational database in the version control system and one or more files of a different version of the relational database in the version control system, and executing one or more database commands based on the determined differences so that contents of the relational database are the same as the different version; and
detecting a change to the relational database, and creating a second version of the database in the version control system based on the detected change.

9. The program product of claim 8, wherein a particular row of the identified rows is modified if the particular row has been created, deleted, or changed in the database since the first point in time.

10. The program product of claim 8, wherein each respective file stores a plurality of rows of a table in the database.

11. The program product of claim 8, wherein identifying the one or more rows is performed by a database management system.

12. The program product of claim 8, wherein creating the first version and creating the second version is performed by a version control system.

13. The program product of claim 8, wherein the operations further comprise:
executing one or more database commands based on one or more determined differences between the first version of the relational database and the second version of the relational database to restore the relational database to the first version of the database.

14. The program product of claim 8, wherein the operations further comprise:
executing one or more database commands based on one or more determined differences between the first version of the relational database and the second version of the relational database to restore the relational database to the second version of the database.

15. A system comprising:
data processing apparatus comprising at least one processor and one or more memory devices for storing instructions to cause the at least one processor to perform operations comprising:
identifying one or more rows in a relational database that have each been modified since a first point in time, wherein each of the rows is associated with a respective table in the relational database;
serializing each of the identified rows into a respective serialized format wherein the serialized format does not include structured query language;
for each of the identified rows, updating a respective file in an external representation of the table associated with the row with the respective serialized format of the row wherein the respective file is not stored in the database;
creating a first version of the relational database in a version control system using the external representation including one or more of the updated files, wherein the first version of the database comprises one or more files in the version control system;
determining one or more differences between one or more files of the first version of the relational database in the version control system and one or more files of a different version of the relational database in the version control system, and executing one or more database commands based on the determined differences so that contents of the relational database are the same as the different version; and
detecting a change to the relational database, and creating a second version of the database in the version control system based on the detected change.

16. The system of claim 15, wherein a particular row of the identified rows is modified if the particular row has been created, deleted, or changed in the database since the first point in time.

17. The system of claim 15, wherein each respective file stores a plurality of rows of a table in the database.

18. The system of claim 15, wherein identifying the one or more rows is performed by a database management system.

19. The system of claim 15, wherein creating the first version and creating the second version is performed by a version control system.

20. The system of claim 15, wherein the operations further comprise:
executing one or more database commands based on one or more determined differences between the first version of the relational database and the second version of the relational database to restore the relational database to the first version of the database.

21. The system of claim 15, wherein the operations further comprise:
executing one or more database commands based on one or more determined differences between the first version of the relational database and the second version of the relational database to restore the relational database to the second version of the database.

* * * * *